United States Patent
Sugiyama et al.

(10) Patent No.: US 10,184,816 B2
(45) Date of Patent: Jan. 22, 2019

(54) MEASUREMENT UNIT AND FLOW RATE METER

(71) Applicant: Panasonic Intellectual Property Management Co., Ltd., Osaka (JP)

(72) Inventors: Masaki Sugiyama, Kyoto (JP); Hideaki Morihana, Nara (JP); Hidetomo Nagahara, Kyoto (JP); Yuji Nakabayashi, Nara (JP); Hideki Kinoshita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/738,422

(22) PCT Filed: Mar. 9, 2016

(86) PCT No.: PCT/JP2016/001289
§ 371 (c)(1),
(2) Date: Dec. 20, 2017

(87) PCT Pub. No.: WO2017/002281
PCT Pub. Date: Jan. 5, 2017

(65) Prior Publication Data
US 2018/0188086 A1  Jul. 5, 2018

(30) Foreign Application Priority Data

Jun. 30, 2015  (JP) .................. 2015-130801

(51) Int. Cl.
*G01F 1/66* (2006.01)
*G01F 15/00* (2006.01)

(52) U.S. Cl.
CPC .............. *G01F 1/662* (2013.01); *G01F 1/668* (2013.01); *G01F 15/00* (2013.01)

(58) Field of Classification Search
CPC ........................................................ G01F 1/66
See application file for complete search history.

(56) References Cited

U.S. PATENT DOCUMENTS 8,161,824 B2 *  4/2012  Satou ................. G01F 1/662
                                                      73/861.27
8,701,501 B2 *  4/2014  Miyata ............... G01F 1/667
                                                      73/861.18
(Continued)

FOREIGN PATENT DOCUMENTS

EP        1612520 A1   1/2006
EP        2080996 A1   7/2009
JP        2014-77679 A 5/2014

OTHER PUBLICATIONS

International Search Report in corresponding International Application No. PCT/JP2016/001289, dated Apr. 5, 2016, 3 pages.

(Continued)

*Primary Examiner* — Jewel V Dowtin
(74) *Attorney, Agent, or Firm* — Brinks Gilson & Lione

(57) ABSTRACT

A measurement unit includes a fluid inlet to let a fluid flow in, a fluid outlet to let the fluid flow out, and a single flow path connecting the fluid inlet with the fluid outlet. The measurement unit further includes a plurality of partition boards and a measuring instrument. The plurality of partition boards are disposed along a current of the fluid and between facing side surfaces of the flow path. The plurality of partition boards define M flow path segments (where M is an integer of 2 or greater) between the facing side surfaces. The measuring instrument measures a flow rate of the fluid flowing through N successively adjacent flow path segments (where N is an integer of 1 or greater and less than M).

12 Claims, 10 Drawing Sheets

(56) References Cited

U.S. PATENT DOCUMENTS

| | | | |
|---|---|---|---|
| 9,551,603 B2* | 1/2017 | Satou | G01F 1/66 |
| 2013/0239699 A1* | 9/2013 | Ozaki | G01F 1/66 73/861.28 |
| 2015/0253166 A1 | 9/2015 | Yasuda et al. | |

OTHER PUBLICATIONS

The Extended European Search Report dated May 25, 2018 for the related European Patent Application No. 16817395.3.

* cited by examiner

MEASUREMENT UNIT AND FLOW RATE METER

This application is a U.S. national stage application of the PCT International Application No. PCT/JP2016/001289 filed on Mar. 9, 2016, which claims the benefit of foreign priority of Japanese patent application No. 2015-130801 filed on Jun. 30, 2015, the contents all of which are incorporated herein by reference.

TECHNICAL FIELD

The present invention relates to a measurement unit for measuring a flow rate of a gas or other fluids, and to a flow rate meter having the measurement unit built-in.

BACKGROUND ART

PTL 1 discloses a flow rate meter such as a gas meter. The flow rate meter includes an inlet to allow a fluid to flow in, an outlet to allow the fluid to flow out, and a plurality of flow paths connecting the inlet with the outlet and having an identical shape. Some of the flow paths are provided with a sensor, whereas the remaining flow paths are without the sensor. The sensor detects a flow rate of the fluid passing through the flow paths provided with the sensor. The flow rate meter estimates an overall flow rate based on the detected flow rate of the fluid passing through the flow paths provided with the sensor.

CITATION LIST

Patent Literature

PTL 1: Unexamined Japanese Patent Publication No. 2014-77679

SUMMARY OF THE INVENTION

The flow rate meter disclosed in PTL 1 includes the nine flow paths disposed between the inlet and the outlet. The individual flow paths need to be securely joined to the inlet and the outlet to prevent leakage of the fluid. The number of joints and the load of work go up with an increase in the number of flow paths. A flow rate meter having a small number of joints is required.

An illustrative measurement unit according to the present invention includes a fluid inlet to let a fluid flow in, a fluid outlet to let the fluid flow out, and a single flow path connecting the fluid inlet with the fluid outlet. The measurement unit further includes a plurality of partition boards and a measuring instrument. The partition boards are disposed along a current of the fluid and between facing side surfaces of the flow path. The partition boards define M flow path segments (where M is an integer of 2 or greater) between the facing side surfaces. The measuring instrument measures a flow rate of the fluid flowing through N successively adjacent flow path segments (where N is an integer of 1 or greater and less than M).

The measurement unit according to the present invention has the single flow path connecting the fluid inlet with the fluid outlet. This configuration allows a substantial reduction in the number of joints that can cause leakage of a fluid. If the flow path has an upstream opening and a downstream opening that serve as the fluid inlet and the fluid outlet, respectively, for example, the measurement unit has practically no joints and thus prevents leakage of the fluid.

DESCRIPTION OF EMBODIMENT

Figure 1:
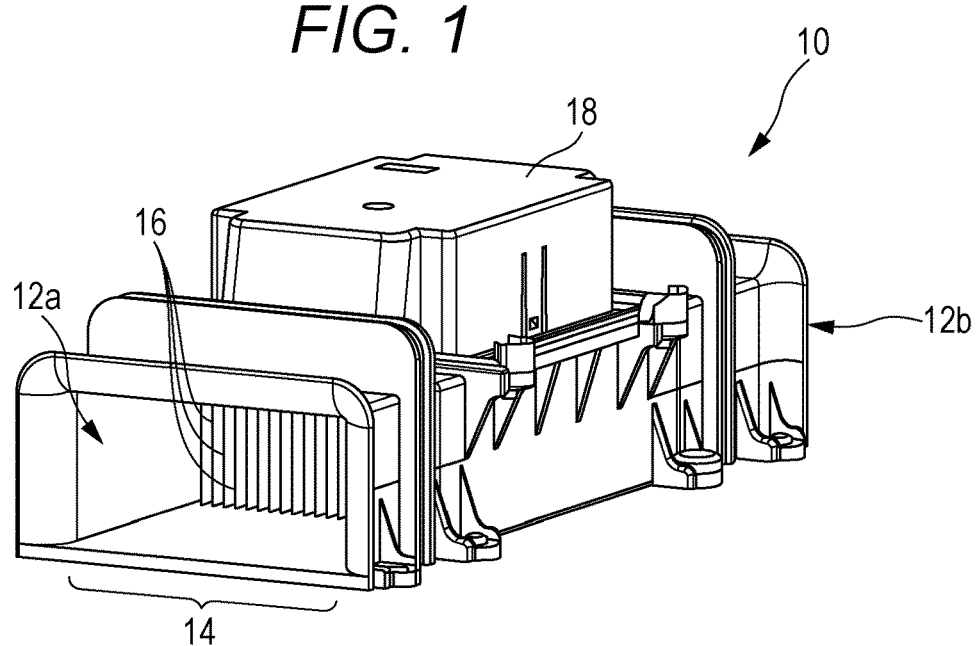
FIG. 1 is an exterior perspective view of a measurement unit according to an exemplary embodiment of the present invention.

A measurement unit and a flow rate meter according to an exemplary embodiment of the present invention will now be described with reference to the accompanying drawings. Identical components are denoted by the same reference numerals or symbols, and redundant descriptions thereof are omitted. The scope of the present invention should not be limited to the exemplary embodiment described below.

In this specification, the flow rate meter is connected to piping for distributing a fluid and measures a flow rate of the fluid passing through the piping. The fluid is typically a gas and may be other fluid such as a liquid. The flow rate meter has a measurement unit built-in. The measurement unit measures a flow rate of the fluid. In other words, the measurement unit is a component of the flow rate meter. A configuration of the measurement unit will now be described in detail, followed by descriptions of flow rate meters that each include the built-in measurement unit.

(Exemplary Embodiment)

Figure 2:
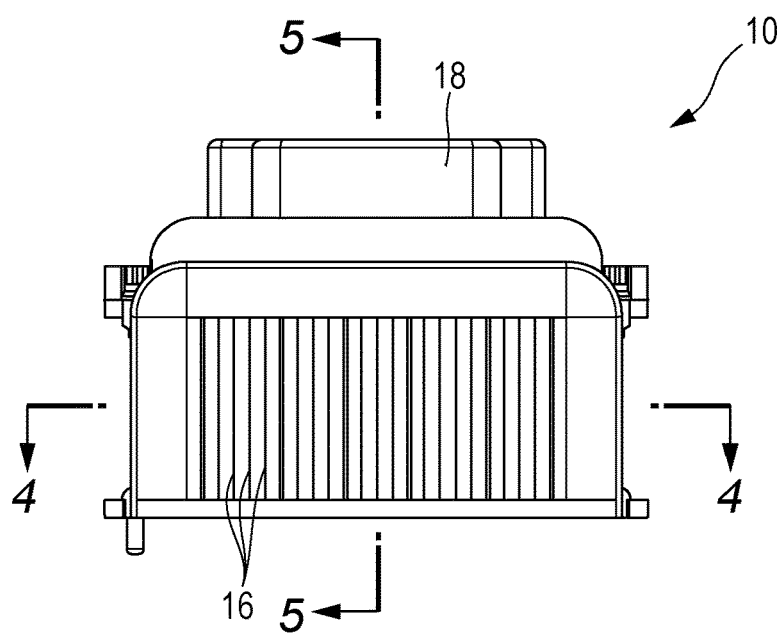
FIG. 2 is an elevation view of the measurement unit according to the exemplary embodiment of the present invention.
Figure 3:
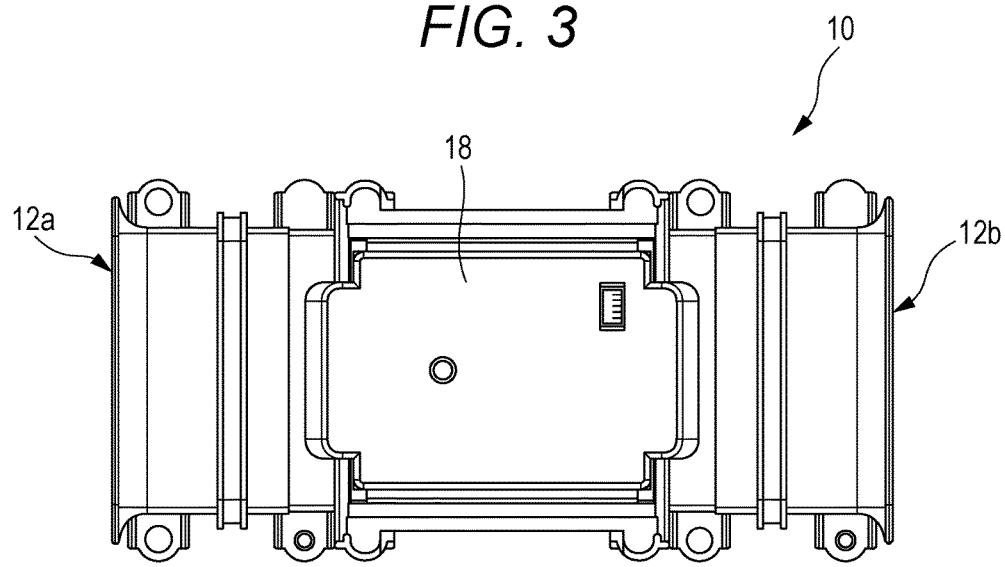
FIG. 3 is a top view of the measurement unit according to the exemplary embodiment of the present invention.

FIG. 1 is an exterior perspective view of measurement unit 10. FIG. 2 is an elevation view of and FIG. 3 is a top view of the measurement unit. FIG. 1 will be primarily referred.

Measurement unit 10 includes fluid inlet 12a, fluid outlet 12b, flow path 14, a plurality of partition boards 16, and measuring instrument 18. A fluid subject to measurement flows into measurement unit 10 via fluid inlet 12a, passes through flow path 14, and flows out via fluid outlet 12b. Flow path 14 is a single path connecting fluid inlet 12a with fluid outlet 12b.

Partition boards 16 are disposed along a current of the fluid inside flow path 14. The current of the fluid runs in a direction from fluid inlet 12a to fluid outlet 12b. In this exemplary embodiment, a number of partition boards 16 is 23. However, this number is an example. The number of partition boards 16 may be greater or fewer than 23.

Figure 4:
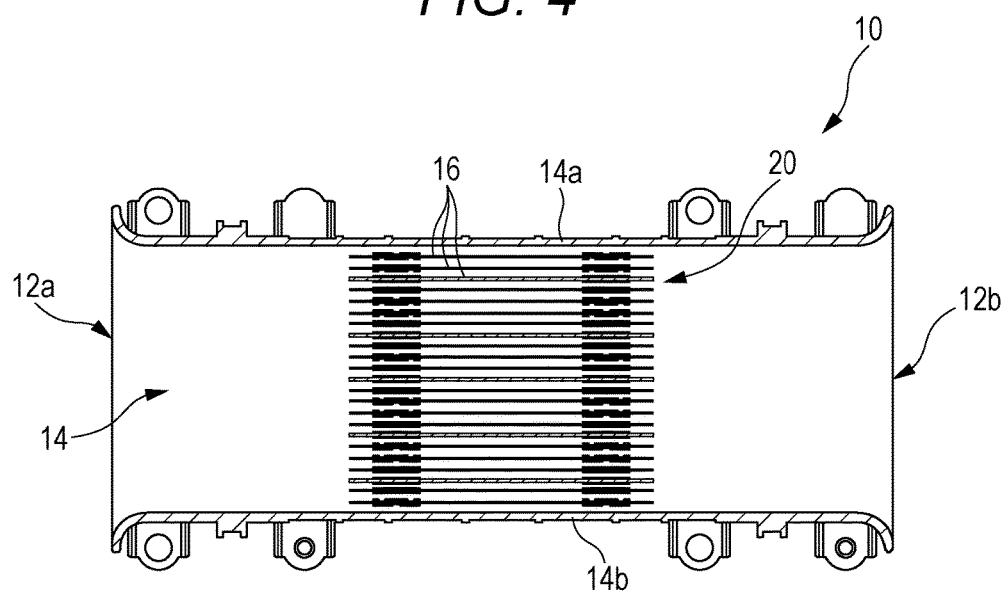
FIG. 4 is a cross-sectional plan view taken from line 4-4 of FIG. 2.
Figure 5:
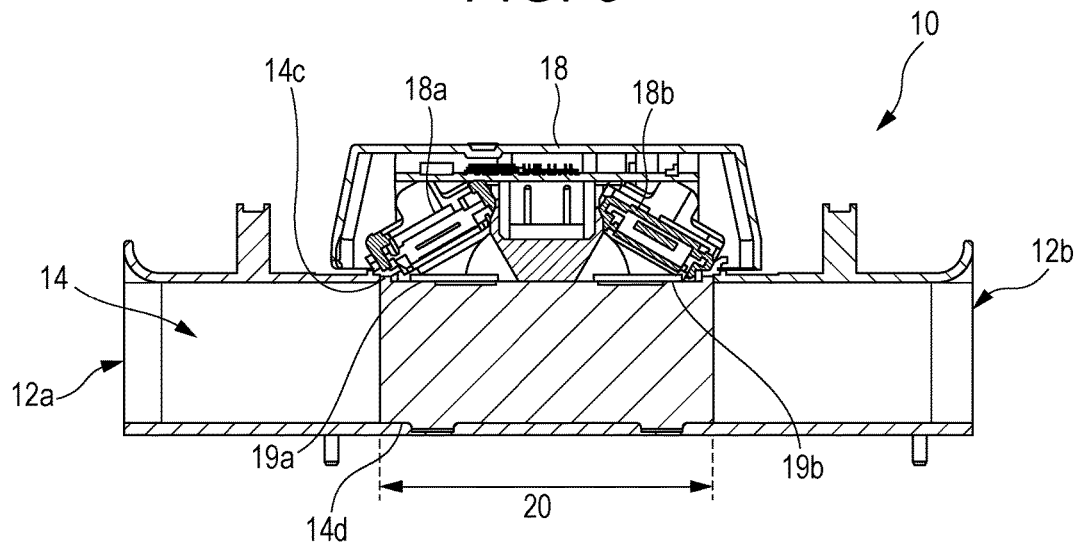
FIG. 5 is a cross-sectional plan view taken from line 5-5 of FIG. 2.

FIG. 4 is a cross-sectional plan view taken from line 4-4 of FIG. 2. FIG. 5 is a cross-sectional plan view taken from line 5-5 of FIG. 2.

As illustrated in FIG. 4, partition boards 16 are disposed between side surface 14a and side surface 14b facing each other through flow path 14 and are in parallel with one another along the current of the fluid. In this exemplary embodiment, adjacent partition boards 16 are disposed at intervals that are substantially equal to one another.

Flow path 14 is divided into a plurality of flow path segments by partition boards 16. For instance, flow path segment 20 is defined by two partition boards 16, as well as upper surface 14c and lower surface 14d facing each other through flow path 14 (FIG. 5).

Figure 6:
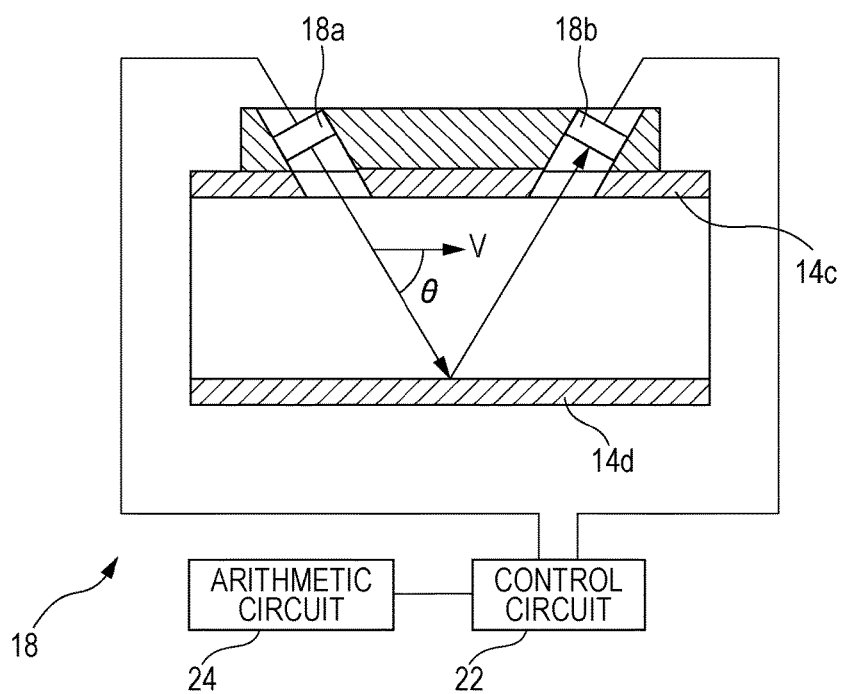
FIG. 6 is a drawing illustrating a specific configuration of a measuring instrument for the measurement unit according to the exemplary embodiment of the present invention.

With reference to FIGS. 5 and 6, measuring instrument 18 will now be described.

FIG. 5 shows a cross section of measuring instrument 18. In this exemplary embodiment, measuring instrument 18 is an ultrasonic sensor unit that measures flow rates by using ultrasonic waves. Measuring instrument 18 measures a flow rate of the fluid flowing through some of the flow path segments by using ultrasonic waves. Based on the measured flow rate, measuring instrument 18 calculates an overall flow rate of the fluid flowing through flow path 14.

Measuring instrument 18 sends and receives ultrasonic waves by using first ultrasonic transmitter-receiver 18a disposed upstream and second ultrasonic transmitter-receiver 18b disposed downstream. Upper surface 14c for flow path 14 has first ultrasonic transmission window 19a and second ultrasonic transmission window 19b. First and second ultrasonic transmission windows 19a and 19b may be made from a material that transmits ultrasonic waves, or may each constitute an opening to transmit ultrasonic waves. First and second ultrasonic transmission windows 19a and 19b may be made from a material that transmits ultrasonic waves, with proviso that the difference between acoustic impedance at an incident surface and acoustic impedance at a transmitted surface is less than a predetermined value. A part of upper surface 14c other than first and second ultrasonic transmission windows 19a and 19b may be covered with a panel, for example. Lower surface 14d serves as a surface that reflects ultrasonic waves.

A principle of flow rate measurement using ultrasonic waves will now be described with reference to FIG. 6. In this exemplary embodiment, a total number of the flow path segments is M. Measuring instrument 18 is disposed so as to cover N pieces out of the M flow path segments. Measuring instrument 18 measures flow rate S of the fluid flowing through the N flow path segments.

FIG. 6 shows a specific configuration of measuring instrument 18. Measuring instrument 18 includes first ultrasonic transmitter-receiver 18a, second ultrasonic transmitter-receiver 18b, control circuit 22, and arithmetic circuit 24.

V represents a velocity of the fluid flowing through flow path 14. C represents a velocity of sound traveling in the fluid. θ is an angle that a direction of the flowing fluid forms with a direction of ultrasonic waves propagating to lower surface 14d for reflection. L represents an effective length of a route for ultrasonic waves propagating between first and second ultrasonic transmitters-receivers 18a and 18b.

Control circuit 22 controls both sending ultrasonic waves from first ultrasonic transmitter-receiver 18a and receiving ultrasonic waves at second ultrasonic transmitter-receiver 18b. Propagation time t1 between sending of ultrasonic waves from first ultrasonic transmitter-receiver 18a and arrival of the ultrasonic waves at second ultrasonic transmitter-receiver 18b is expressed by the following equation:

$$t1 = L/(C + V \cos \theta) \quad (1)$$

Control circuit 22 controls both sending ultrasonic waves from second ultrasonic transmitter-receiver 18b and receiving ultrasonic waves at first ultrasonic transmitter-receiver 18a. Propagation time t2 between sending of ultrasonic waves from second ultrasonic transmitter-receiver 18b and arrival of the ultrasonic waves at first ultrasonic transmitter-receiver 18a is expressed by the following equation:

$$t2 = L/(C - V \cos \theta) \quad (2)$$

Sound velocity C in the fluid is eliminated from equations (1) and (2) to obtain the following equation:

$$V = (L/(2 \cos \theta)) \times ((1/t1) - (1/t2)) \quad (3)$$

As illustrated in equation (3), if L and θ are known, the measuring instrument can determine fluid velocity V by getting control circuit 22 to measure propagation time t1 and t2. Arithmetic circuit 24 calculates fluid velocity V.

Arithmetic circuit 24 then multiplies fluid velocity V by cross-sectional area SN of the N flow path segments to calculate flow rate qeN of the fluid passing through the N flow path segments, as shown in the following equation, where cross-sectional area SN is a known quantity.

$$qeN = V \times SN \quad (4)$$

Arithmetic circuit 24 converts the flow rate of the fluid flowing through the flow path segments into a flow rate of the fluid flowing through flow path 14. In other words, arithmetic circuit 24 calculates overall flow rate qe for flow path 14 based on flow rate qeN for the flow path segments. A relationship between qeN and qe has been verified by experiment in advance. Arithmetic circuit 24 corrects flow rate qeN by coefficient K verified in advance and determines flow rate qe.

$$qe = K \times qeN \quad (5)$$

Equation (6) shown below is obtained from equations (4) and (5).

$$qe = K \times V \times SN \quad (6)$$
$$= Ks \times V$$

In other words, arithmetic circuit 24 can calculate a flow rate for flow path 14 from fluid velocity V by the use of coefficient Ks(=K×SN) that takes into account cross-sectional area SN of the N flow path segments, without working out equation (4).

Arithmetic circuit 24 can correctly calculate a flow rate of the fluid flowing through flow path 14 even in the case of a deviation of a flow rate of the fluid flowing through the N flow path segments from the flow rate of the fluid flowing through flow path 14, with proviso that coefficient K or Ks has been verified in advance and determined by experiment. The deviation of the flow rate of the fluid flowing through the N flow path segments can possibly occur depending on the fluid velocity. In such a case, coefficients K or Ks may have been verified for respective fluid velocity ranges by experiment to define correspondences between the fluid velocity ranges and the coefficients K or Ks, and these correspondences may have been stored in an internal memory (not shown) on arithmetic circuit 24. Arithmetic circuit 24 can read coefficient K or Ks corresponding to obtained fluid velocity V and calculate a flow rate for flow path 14.

The principle of flow rate measurement described above is one example that implements what is called a V-path method. Another principle of measurement that implements what is called a Z-path or I-path method may be applied.

Measuring instrument 18 is not necessarily ultrasonic. Measuring instrument 18 may be any other widely-known measuring instrument that can be used to measure a flow rate of the fluid flowing through some of the flow path segments. The widely-known measuring instrument may be a thermal flow sensor designed to measure flow rates through the use of flow dependent thermal transfer, for example. Since these sensors are widely known, description thereof is omitted.

Measurement unit 10 having the configuration described above can measure a flow rate of a fluid flowing through flow path 14.

Measurement unit 10 in this exemplary embodiment can measure a flow rate of 10 cubic meters or greater per hour, for example, and more preferably a flow rate ranging from 15 cubic meters to 30 cubic meters inclusive per hour. Measurement units for ordinary households are designed to measure a flow rate of only about 6 cubic meters per hour. Thus, measurement unit 10 can measure relatively high flow rates at facilities for professional purposes. However, measurement unit 10 in this exemplary embodiment may be used at ordinary households.

The measurement unit can structurally measure a fluid of a higher flow rate if fluid inlet 12a and fluid outlet 12b each have an enlarged opening area. If the opening areas are enlarged by extending the interval between facing side surfaces 14a and 14b (FIG. 4), the number of partition boards 16 may be increased. If the opening areas are enlarged by extending the interval between upper and lower surfaces 14c and 14d (FIG. 5), the height of partition boards 16 may be increased.

Alternatively, the measurement unit may be enabled to measure a higher flow rate by having a plurality of measurement units 10.

Figure 7:
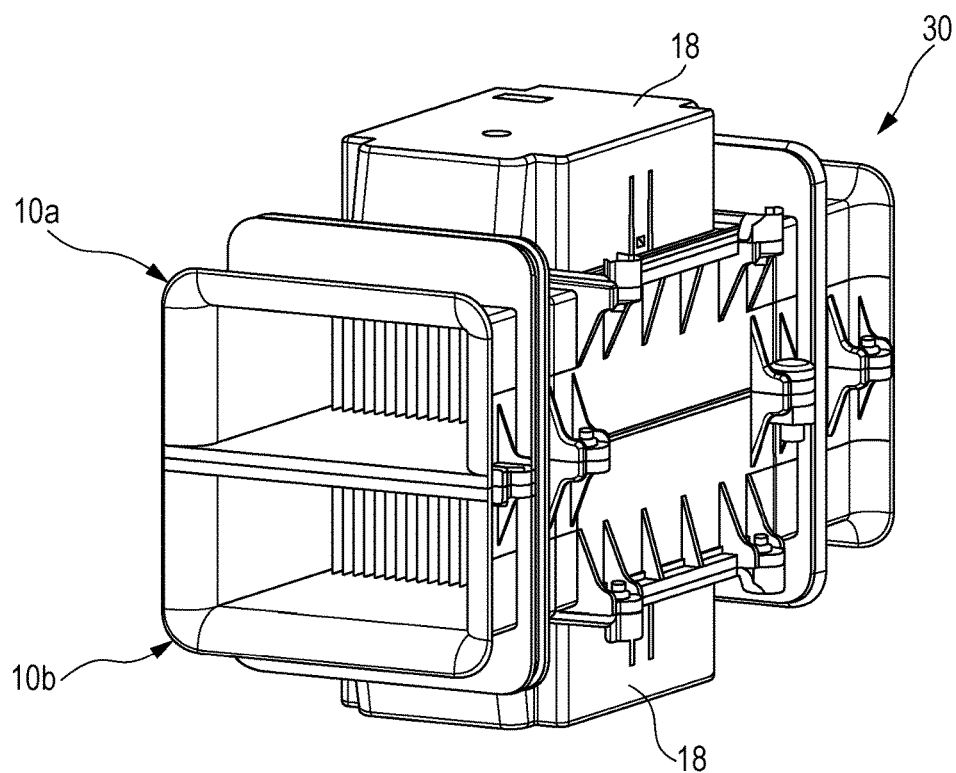
FIG. 7 is a drawing illustrating an example measurement unit that integrates two measurement units according to the exemplary embodiment of the present invention.

FIG. 7 shows an example of measurement unit 30 that integrates two components of measurement unit 10a and measurement unit 10b. Measurement units 10a and 10b each have measuring instrument 18 and independently measure flow rates. Each measuring instrument performs processing as described above. Measurement unit 30 acquires a measured flow rate by adding flow rates that are measured, respectively by measurement units 10a and 10b. This adding processing may be performed by arithmetic circuit 24 of measuring instrument 18 provided on measurement unit 10a, for example. This arithmetic circuit 24 acquires information on a measured flow rate from the arithmetic circuit of measurement unit 10b and adds that information to a flow rate that it has measured. Alternatively, an arithmetic circuit (not shown) disposed outside measurement unit 30 may acquire measured flow rates from arithmetic circuits 24 of measuring instruments 18, respectively provided on measurement units 10a and 10b and add the acquired flow rates together.

Figure 8:
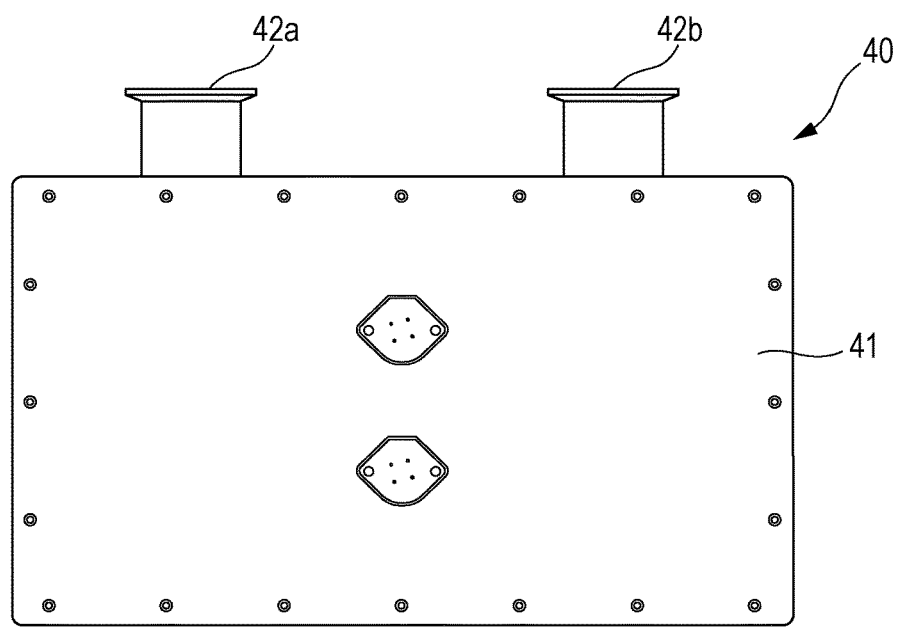
FIG. 8 is an exterior view of an illustrative flow rate meter according to the exemplary embodiment of the present invention.

With reference to FIG. 8 and the subsequent drawings, flow rate meters that each have built-in measurement unit 30 will now be described.

FIG. 8 is an exterior view of flow rate meter 40 according to this exemplary embodiment. Flow rate meter 40 includes upstream port 42a connected to an upstream pipe (not shown) and downstream port 42b connected to a downstream pipe (not shown). Side plate 41 covers an interior of flow rate meter 40.

Figure 9:
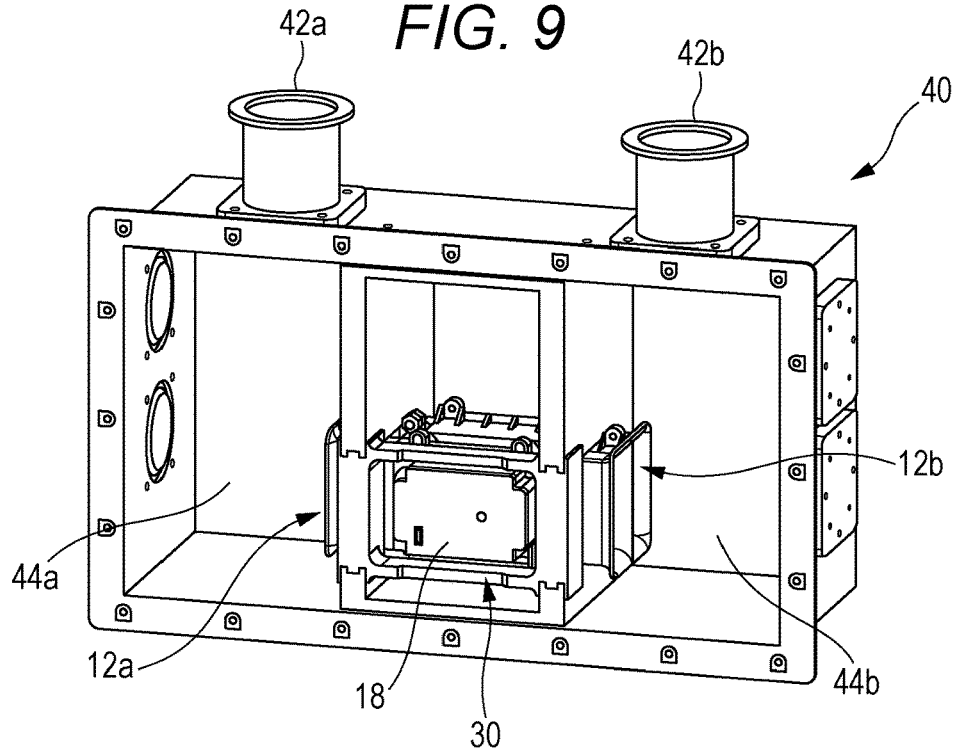
FIG. 9 is a perspective view illustrating an interior configuration of the illustrative flow rate meter without a side plate according to the exemplary embodiment of the present invention.

FIG. 9 is a perspective view illustrating an interior configuration of flow rate meter 40 without side plate 41. Flow rate meter 40 has measurement unit 30, inlet chamber 44a, and outlet chamber 44b inside. Inlet chamber 44a guides a fluid flowing from upstream port 42a to fluid inlet 12a of measurement unit 30. Outlet chamber 44b guides the fluid discharging from fluid outlet 12b of measurement unit 30 to downstream port 42b. Inlet and outlet chambers 44a and 44b each function as a flow path. Upstream port 42a, inlet chamber 44a, measurement unit 30, outlet chamber 44b, and downstream port 42b are disposed in a U-shape. Flow rate meters having a disposition like this are called "U-shaped flow rate meters".

In this exemplary embodiment, as illustrated in the position of measuring instrument 18 in FIG. 9, measurement unit 30 built into flow rate meter 40 is rotated 90 degrees on an axis parallel to the direction of flowing fluid from the posture of the measurement unit shown in FIG. 7. The orientation of built-in measurement unit 30 shown herein is an example. The built-in measurement unit may be configured in any other way.

Figure 10:
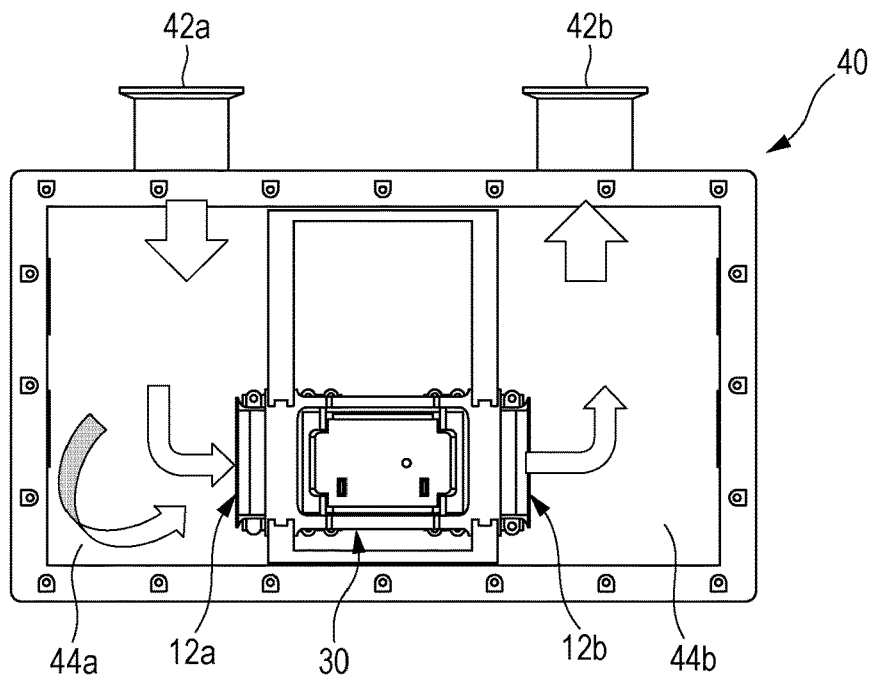
FIG. 10 is a drawing illustrating a current of a fluid inside the illustrative flow rate meter by four thick arrows according to the exemplary embodiment of the present invention.

FIG. 10 shows a current of a fluid inside flow rate meter 40 by four thick arrows. Because of provided inlet chamber 44a, the fluid flowing into flow rate meter 40 from upstream port 42a diffuses in inlet chamber 44a. As a result, the fluid in nearly uniform flux goes toward fluid inlet 12a of measurement unit 30. The fluid nearly evenly flows through the flow path segments of individual measurement units 10 that constitute measurement unit 30 owing to resistance of multilayer boards. This configuration allows the flow rate meter to assure continued accuracy in calculating flow rates by equation (5) described above.

The flow rate meter may be provided with a rectifier flow path to enable the fluid to more evenly flow into the flow path segments of individual measurement units 10.

Figure 11:
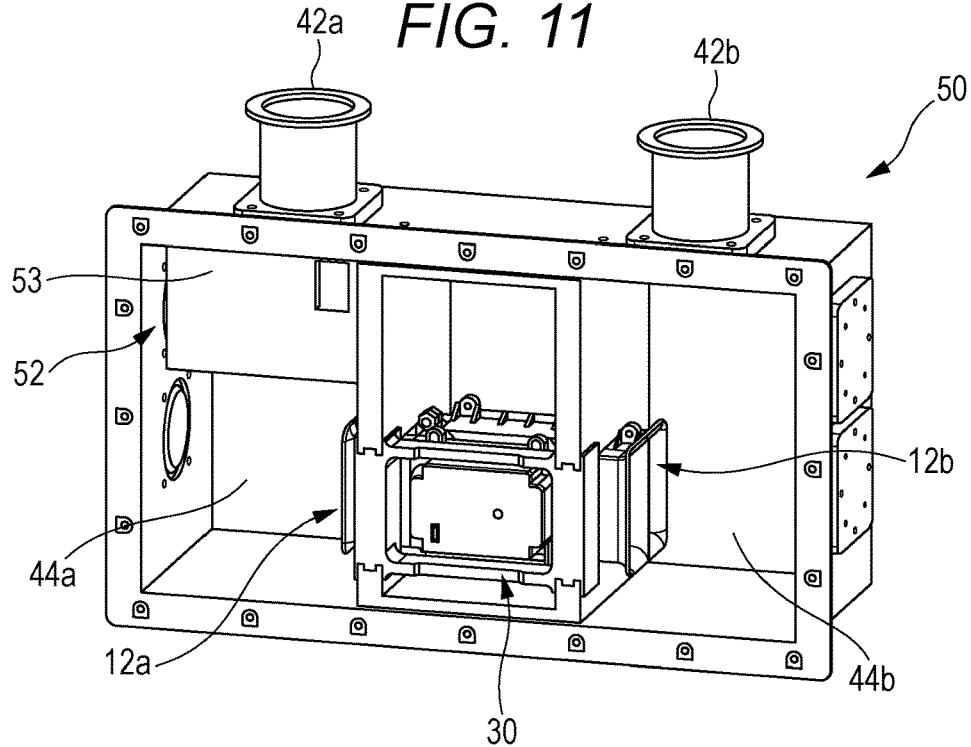
FIG. 11 is a perspective view illustrating an interior configuration of the illustrative flow rate meter provided with a rectifier flow path according to the exemplary embodiment of the present invention.

FIG. 11 is a perspective view illustrating an interior configuration of flow rate meter 50 provided with rectifier flow path 52. Flow rate meter 50 is provided with rectifier flow path 52 but otherwise identical to flow rate meter 40 (FIG. 10).

Rectifier flow path 52 is disposed inside inlet chamber 44a and immediately below upstream port 42a. The fluid flowing into flow rate meter 50 from upstream port 42a enters rectifier flow path 52 and flows into inlet chamber 44a via rectifier flow path 52. In FIG. 11, rectifier flow path 52 is provided with covering 53 to ensure that all the fluid flowing into flow rate meter 50 from upstream port 42a passes through rectifier flow path 52.

Figure 12:
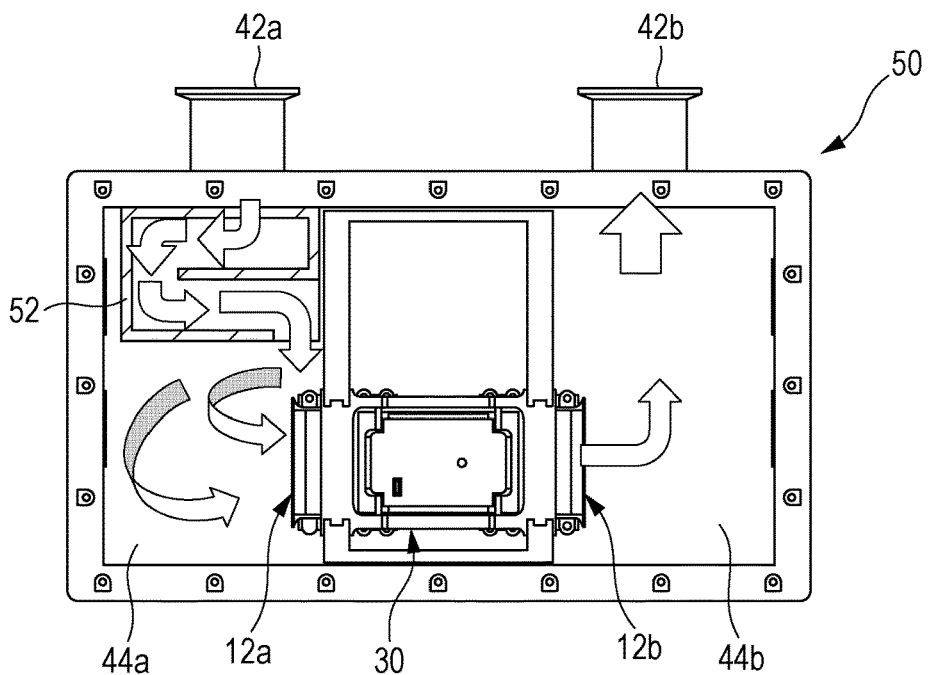
FIG. 12 is a drawing illustrating a current of a fluid inside the illustrative flow rate meter provided with the rectifier flow path according to the exemplary embodiment of the present invention.

FIG. 12 shows an interior configuration of rectifier flow path 52. As shown with four thick arrows in rectifier flow path 52 in FIG. 12, rectifier flow path 52 alters a course of the fluid four times.

The flow rate meter is provided with rectifier flow path 52 that alters the course of the fluid and thus can reduce an imbalance in the distribution of fluid velocities inside a flow path running from upstream port 42a to fluid inlet 12a of measurement unit 30. Even if the flowing fluid has an uneven or swirl flow, the flow rate meter provided with rectifier flow path 52 can adequately diminish influence of that flow. This configuration allows a fluid having a relatively uniform velocity distribution to flow into fluid inlet 12a of measurement unit 30 and makes possible ideal measurement of flow rates. The flow rate meter may have rectifier flow path 52 that alters the course of the fluid at least once, in comparison to the configuration without rectifier flow path 52 in FIG. 10.

Figure 13:
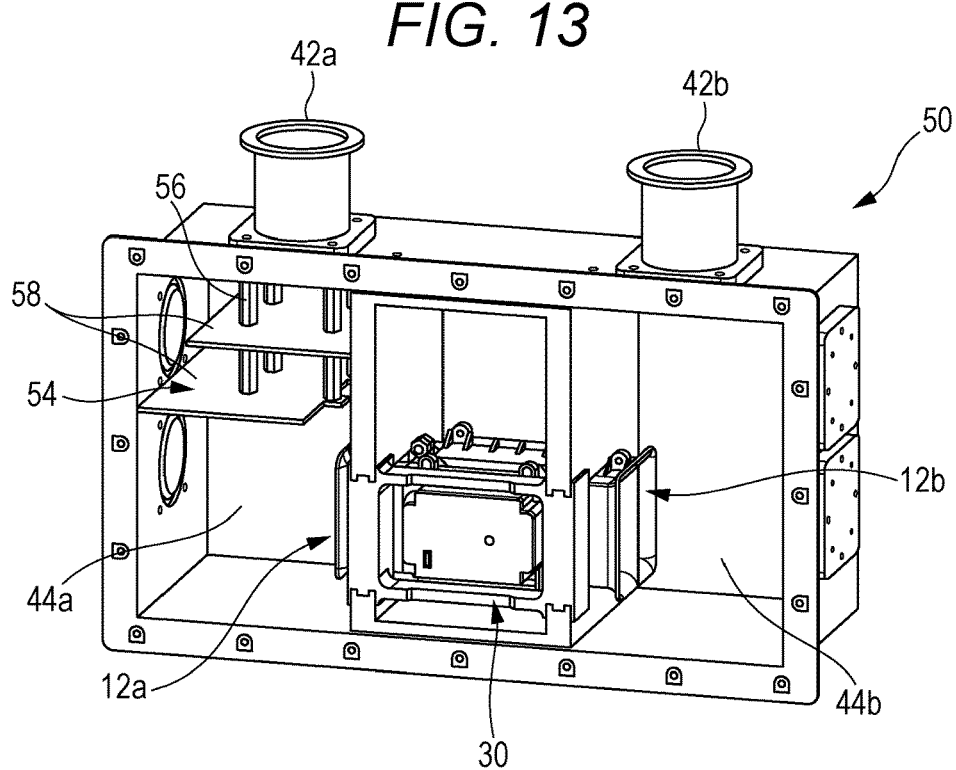
FIG. 13 is a perspective view illustrating an interior configuration of the illustrative flow rate meter provided with an alternative rectifier flow path according to the exemplary embodiment of the present invention.

FIG. 13 is a perspective view illustrating an interior configuration of flow rate meter 50 provided with alternative rectifier flow path 54. Portrayal of covering 53 shown in FIG. 11 is omitted here for the sake of description.

A configuration of rectifier flow path 54 is roughly equivalent to the configuration of rectifier flow path 52 (FIG. 12). A distinction between the components is that rectifier flow path 54 includes at least one column 56. Column 56 is provided to secure a plurality of plates 58 that form a flow path and to partly block a current of the fluid so as to ensure a more uniform distribution of fluid velocities.

Rectifier flow path 52 described above in FIG. 12 is provided as a single component (a structure). Meanwhile, rectifier flow path 54 is made up of a plurality of parts that are installed inside flow rate meter 50. In this exemplary embodiment, rectifier flow path 54 is formed of a plurality of columns 56, plates 58, and a part of peripheral walls of flow rate meter 50.

Figure 14:
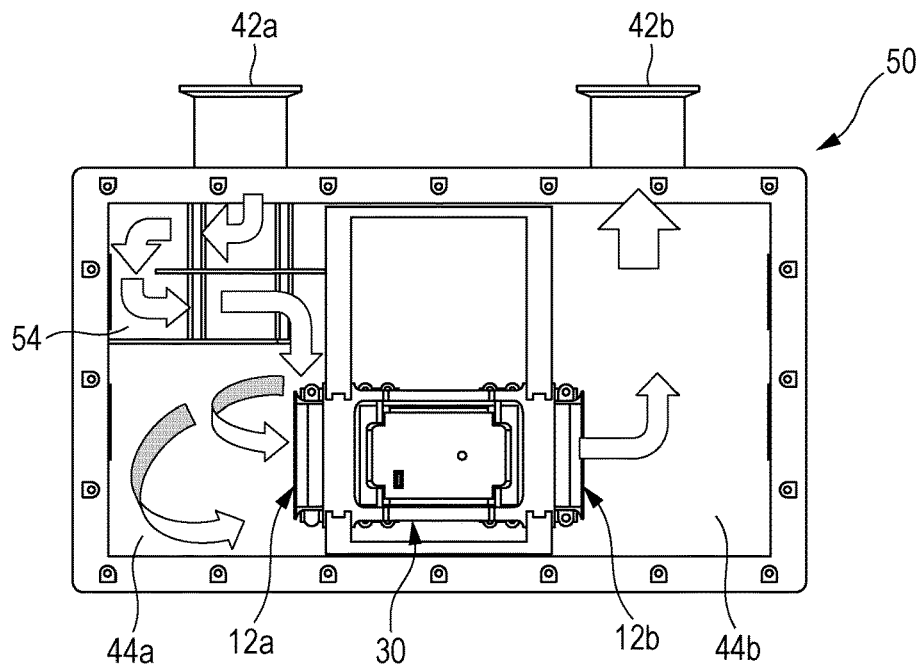
FIG. 14 is a drawing illustrating a current of a fluid inside the illustrative flow rate meter provided with the alternative rectifier flow path according to the exemplary embodiment of the present invention.

FIG. 14 shows a current of a fluid inside rectifier flow path 54 and a current of the fluid inside flow rate meter 50. Rectifier flow path 54 shown in FIG. 14 as well alters a course of the fluid four times. This configuration ensures a relatively uniform distribution of fluid velocities on a par with rectifier flow path 52 (FIG. 12). As described above, rectifier flow path 54 is formed by securing columns 56 and plates 58. This enables installation at low cost and with ease.

Figure 15:
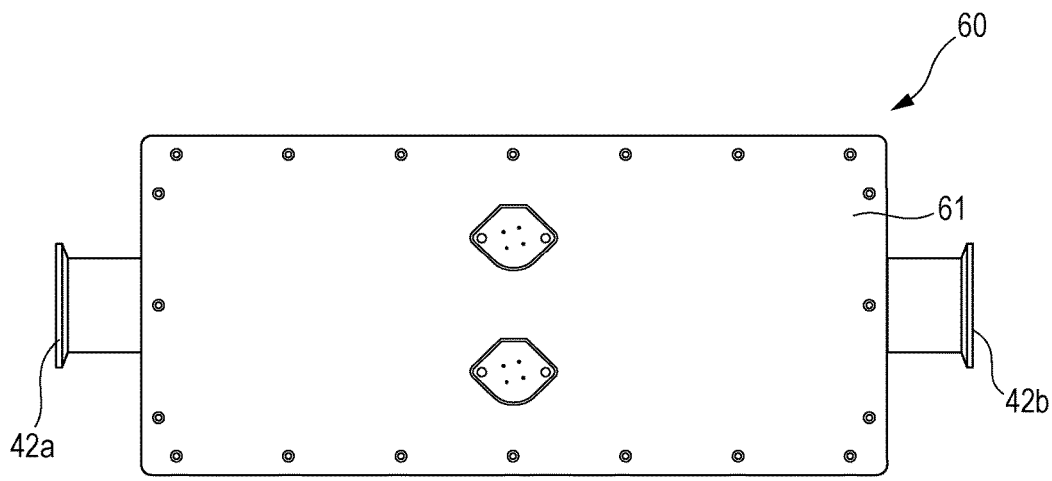
FIG. 15 is an exterior view of an alternative illustrative flow rate meter according to the exemplary embodiment of the present invention.

Both flow rate meters 40 and 50 described above are U-shaped flow rate meters. With reference to FIG. 15 and the subsequent drawings, flow rate meters of a different type (shape) will now be described.

FIG. 15 is an exterior view of alternative flow rate meter 60 according to this exemplary embodiment. Flow rate meter 60 includes upstream port 42a connected to an upstream pipe (not shown) and downstream port 42b connected to a downstream pipe (not shown). A comparison of this flow rate meter to flow rate meter 40 shown in FIG. 8 illustrates a difference in position of upstream and downstream ports 42a and 42b. Side plate 61 covers an interior of flow rate meter 60.

Figure 16:
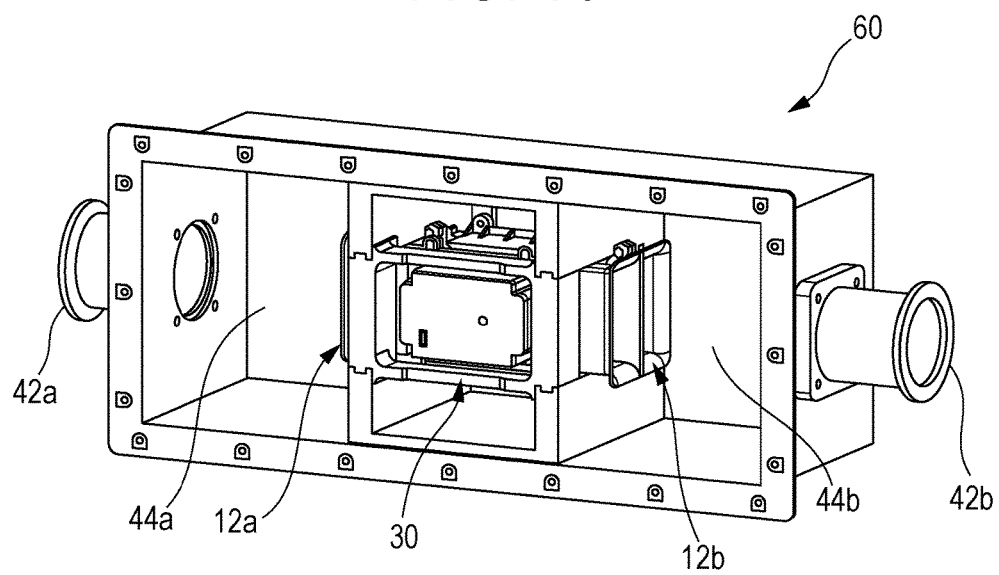
FIG. 16 is a perspective view illustrating an interior configuration of the alternative illustrative flow rate meter without a side plate according to the exemplary embodiment of the present invention.

FIG. 16 is a perspective view illustrating an interior configuration of flow rate meter 60 without side plate 61.

Flow rate meter 60 has upstream port 42a and downstream port 42b that are disposed differently from the corresponding ports of flow rate meter 40 in FIG. 8. The other components are common to these flow rate meters. In flow rate meter 60, upstream port 42a, inlet chamber 44a, measurement unit 30, outlet chamber 44b, and downstream port 42b are disposed linearly. Flow rate meters having a disposition like this are called "I-shaped flow rate meters".

Figure 17:
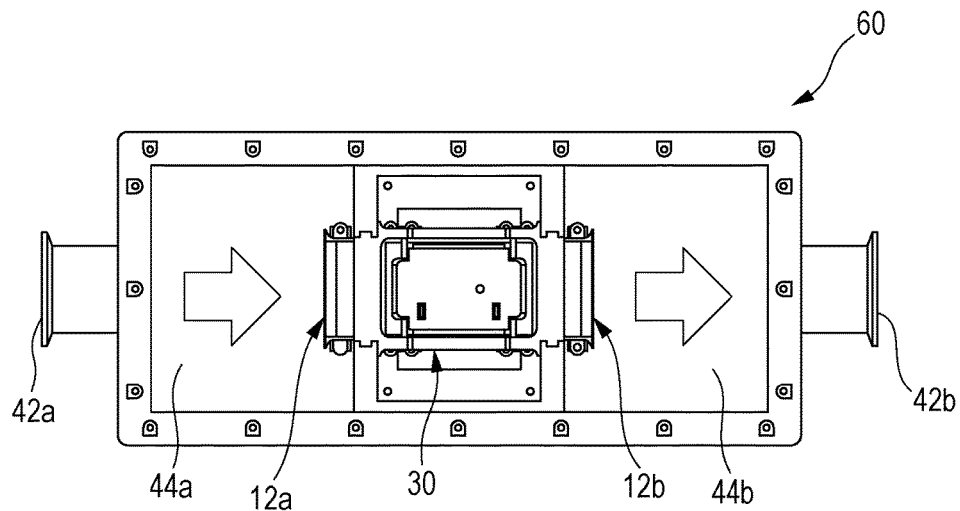
FIG. 17 is a drawing illustrating a current of a fluid inside the alternative illustrative flow rate meter by two thick arrows according to the exemplary embodiment of the present invention.

FIG. 17 shows a current of a fluid inside flow rate meter 60 by two thick arrows. Because of provided inlet chamber 44a, the fluid flowing into flow rate meter 60 from upstream port 42a diffuses in inlet chamber 44a. As a result, the fluid in nearly uniform flux goes toward fluid inlet 12a of measurement unit 30. The fluid nearly evenly flows through the flow path segments of individual measurement units 10 that constitute measurement unit 30. This configuration allows the flow rate meter to assure continued accuracy in calculating flow rates by equation (5) described above.

The I-shaped flow rate meter may be also provided with a rectifier flow path to enable the fluid to more evenly flow into the flow path segments of individual measurement units 10.

Figure 18:
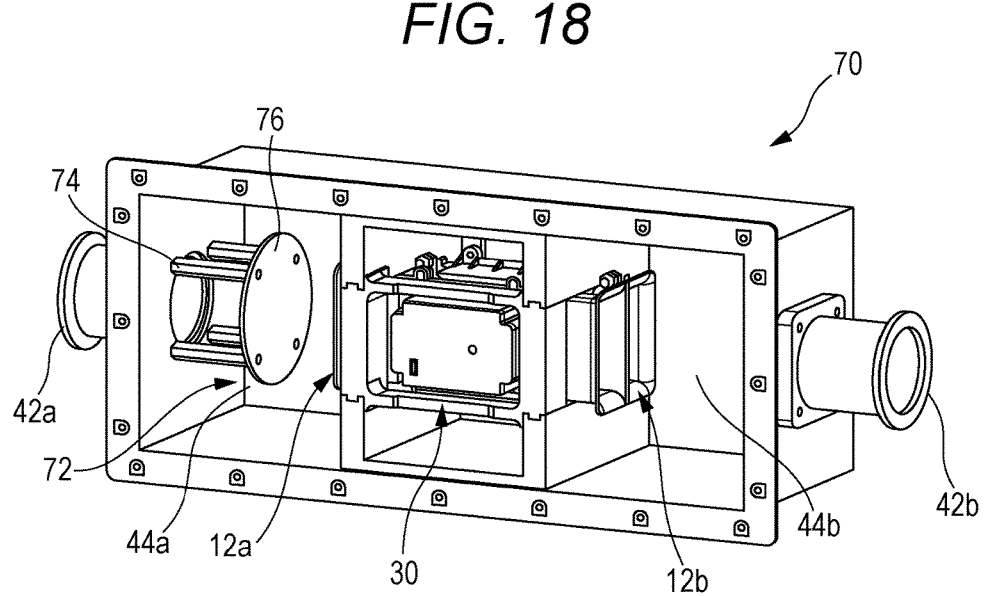
FIG. 18 is a perspective view illustrating an interior configuration of the alternative illustrative flow rate meter provided with a rectifier flow path according to the exemplary embodiment of the present invention.

FIG. 18 is a perspective view illustrating an interior configuration of flow rate meter 70 provided with rectifier flow path 72. Rectifier flow path 72 is disposed inside inlet chamber 44a and just behind upstream port 42a. In an example of FIG. 18, rectifier flow path 72 is disposed so as to obstruct a course of the fluid to ensure that the fluid flowing from upstream port 42a does not directly reach fluid inlet 12a of measurement unit 30. Rectifier flow path 72 includes four legs 74 of a predetermined length and shield 76 attached to the legs.

Figure 19:
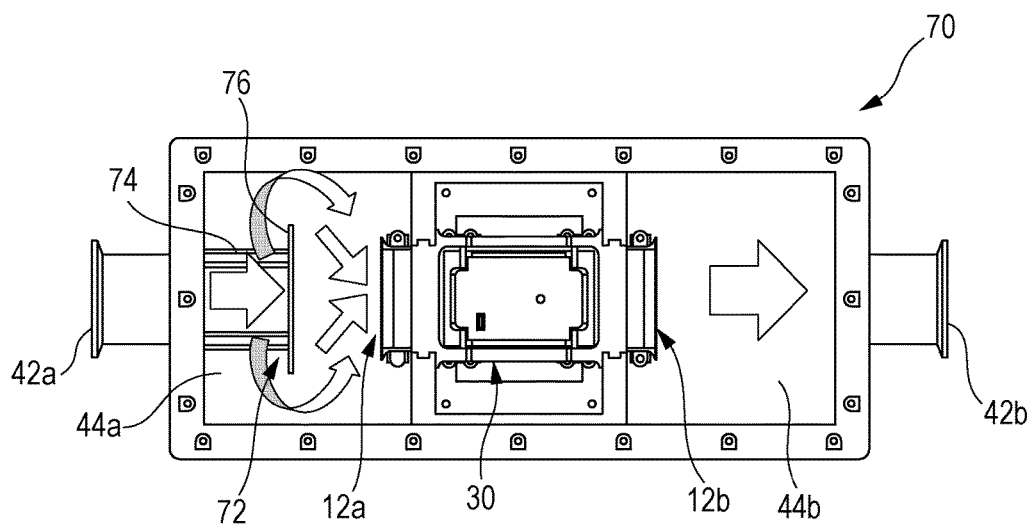
FIG. 19 is a drawing illustrating a current of a fluid inside the rectifier flow path of the alternative illustrative flow rate meter and a current of the fluid inside the same flow rate meter according to the exemplary embodiment of the present invention.

FIG. 19 shows a current of a fluid inside rectifier flow path 72 and a current of the fluid inside flow rate meter 70. Rectifier flow path 72 shown in FIG. 19 as well alters a course of the fluid at least twice. This configuration ensures a uniform distribution of fluid velocities on a par with or better than flow rate meter 60 (FIG. 17).

INDUSTRIAL APPLICABILITY

A measurement unit according to the present invention has a single flow path and calculates a flow rate of a fluid flowing through the flow path. Since the flow path can be readily enlarged, the measurement unit can find a wide variety of applications that require measurement of high flow rates, such as large gas meters for business purposes. A flow rate meter that includes a plurality of the measurement units can be more readily applied to measurement of high flow rates.

REFERENCE MARKS IN THE DRAWINGS 10, 10a, 10b, 30 measurement unit
12a fluid inlet 12b fluid outlet
14 flow path
14a, 14b side surface
14c upper surface
14d lower surface
16 partition board
18 measuring instrument
18a first ultrasonic transmitter-receiver
18b second ultrasonic transmitter-receiver
20 flow path segment
22 control circuit
24 arithmetic circuit
40, 50, 60, 70 flow rate meter
42a upstream port
42b downstream port
44a inlet chamber
44b outlet chamber
52, 54, 72 rectifier flow path

The invention claimed is:

1. A measurement unit comprising:
an inlet to let a fluid flow in;
an outlet to let the fluid flow out;
a single flow path connecting the inlet with the outlet;
a plurality of partition boards being disposed between facing side surfaces of the flow path and being disposed along a current of the fluid, the partition boards defining M flow path segments (where M is an integer of 2 or greater) between the facing side surfaces; and
a measuring instrument to measure a flow rate of the fluid flowing through N successively adjacent flow path segments (where N is an integer of 1 or greater and less than M).

2. The measurement unit according to claim 1, wherein the measuring instrument measures the flow rate of the fluid by using ultrasonic waves.

3. The measurement unit according to claim 2, wherein the measuring instrument includes a first transmitter-receiver and a second transmitter-receiver that are each capable of sending and receiving ultrasonic waves,
the first transmitter-receiver is disposed on an upstream side of the partition boards,
the second transmitter-receiver is disposed on a downstream side of the partition boards,
the first transmitter-receiver receives ultrasonic waves sent from the second transmitter-receiver, and
the second transmitter-receiver receives ultrasonic waves sent from the first transmitter-receiver.

4. The measurement unit according to claim 3, wherein the plurality of partition boards are disposed at intervals that are substantially equal to one another, and
the measuring instrument comprises:
a control circuit to control sending and receiving ultrasonic waves at the first and the second transmitters-receivers; and
an arithmetic circuit to calculate a flow rate of the fluid flowing through the flow path by measuring the flow rate of the fluid flowing through the N flow path segments through use of signals of ultrasonic waves received, respectively, by the first and the second transmitters-receivers and correcting the measured flow rate by a coefficient verified in advance.

5. The measurement unit according to claim 1, wherein the single flow path has a cross-sectional area such that a volume of the fluid passing through the flow path is at least 10 cubic meters per hour.

6. The measurement unit according to claim 1, wherein
24 flow path segments (M=24) are defined by 23 partition boards in the flow path, and
the measuring instrument measures a flow rate of the fluid flowing through 4 flow path segments (N=4).

7. A flow rate meter that is connected to piping for distributing a fluid and measures a flow rate of the fluid passing through the piping, the flow rate meter comprising:
an upstream port connected to an upstream pipe;
a downstream port connected to a downstream pipe;
at least one measurement unit according to claim 1;
an inlet chamber that guides the fluid flowing from the upstream port to the inlet of the at least one measurement unit; and
an outlet path that guides the fluid discharging from the outlet of the at least one measurement unit to the downstream port.

8. The flow rate meter according to claim 7, wherein the upstream port, the inlet chamber, the at least one measurement unit, the outlet path, and the downstream port are disposed in a U-shape.

9. The flow rate meter according to claim 7, wherein the upstream port, the inlet chamber, the at least one measurement unit, the outlet path, and the downstream port are disposed linearly.

10. The flow rate meter according to claim 7, wherein the inlet chamber further includes a rectifier flow path to reduce an imbalance in distribution of velocities of the fluid flowing from the upstream port.

11. The flow rate meter according to claim 10, wherein the rectifier flow path alters a course of the fluid at least once.

12. The flow rate meter according to claim 10, wherein
the at least one measurement unit is composed of two measurement units, and
the measurement units are in contact with each other.

* * * * *